(12) United States Patent
Vyssotski et al.

(10) Patent No.: US 8,275,982 B2
(45) Date of Patent: Sep. 25, 2012

(54) SYSTEM AND METHOD FOR A MANAGED BIOS

(75) Inventors: Nikolai Vyssotski, Austin, TX (US); Alok Pant, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 12/581,419

(22) Filed: Oct. 19, 2009

(65) Prior Publication Data

US 2011/0093690 A1    Apr. 21, 2011

(51) Int. Cl.
*G06F 15/177* (2006.01)
(52) U.S. Cl. .................... 713/1; 713/2; 713/100
(58) Field of Classification Search .......... 713/1, 2, 713/100
See application file for complete search history.

(56) References Cited

U.S. PATENT DOCUMENTS

| | | | | |
|---|---|---|---|---|
| 6,356,965 | B1 * | 3/2002 | Broyles et al. | 710/104 |
| 7,178,019 | B2 * | 2/2007 | Lam | 713/2 |
| 7,747,847 | B2 * | 6/2010 | El Zur et al. | 713/2 |
| 7,873,847 | B2 * | 1/2011 | Bozek et al. | 713/310 |
| 2008/0215868 | A1 | 9/2008 | Lee et al. | |
| 2010/0070792 | A1 * | 3/2010 | Xue et al. | 713/501 |

OTHER PUBLICATIONS

System Management BIOS (SMBIOS) Reference Specification, Version 2.6, Sep. 4, 2008, available at http://www.dmtf.org/standards/published_documents/DSP0134_2.6.0.pdf.
Systems Management Architecture for Mobile and Desktop Hardware, White Paper, Version 1.1.0, Dec. 2007, available at http://www.dmtf.org/standards/published_documents/DSP2014_1.1.0.pdf.

* cited by examiner

*Primary Examiner* — M Elamin
(74) *Attorney, Agent, or Firm* — Baker Botts L.L.P.

(57) ABSTRACT

In accordance with the present disclosure, a system and method for a managed BIOS is disclosed. A software for a BIOS in an information handling system is provided on a computer readable medium. A first code, for execution on a central processing unit (CPU), is operable to initiate a connection to a management controller through a controller, send a message to the management controller through the controller, and receive a message from the management controller through the controller in response to a system management interrupt. The first code is also operable to stall a power-on procedure if it is able to determine a plurality of bootable devices before the connection to the management controller is ready. The first code is further operable to stall the power-on procedure before releasing control to an operating system if the management controller is active.

20 Claims, 4 Drawing Sheets

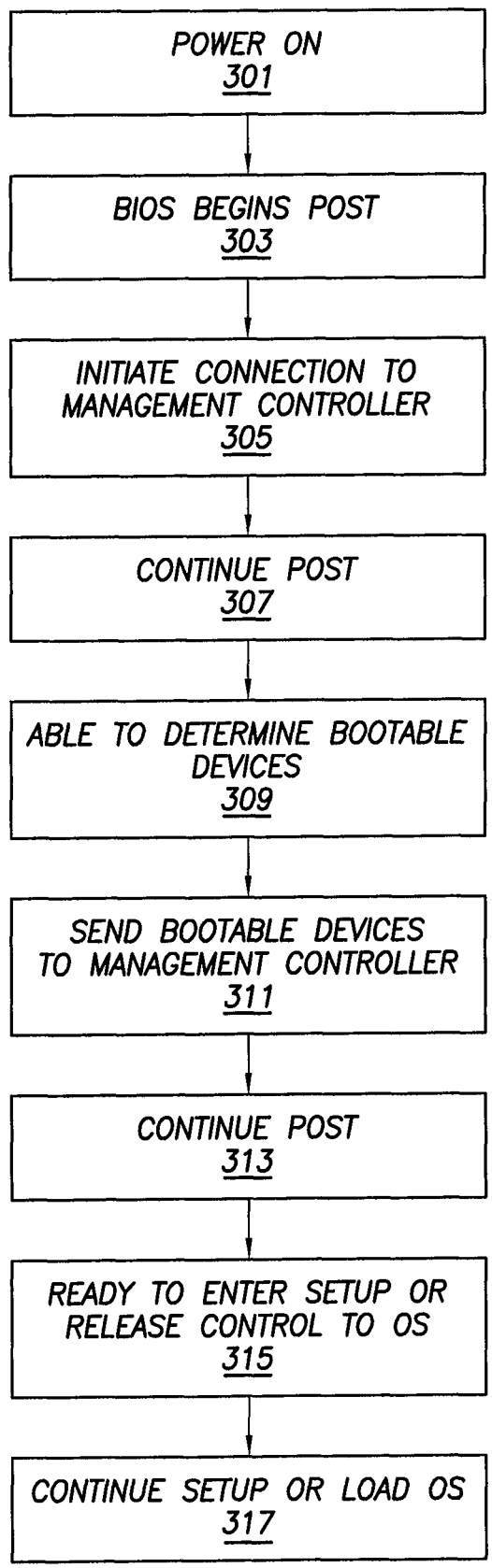

SYSTEM AND METHOD FOR A MANAGED BIOS

TECHNICAL FIELD

The present disclosure relates generally to the operation of computer systems and information handling systems, and, more particularly, to a system and method for a managed BIOS.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may contain a basic input/output system (BIOS). The BIOS is provided on a computer readable medium, such as a nonvolatile memory. When an information handling system is powered on, the central processing unit (CPU) will begin executing instructions from the BIOS in a privileged mode called system management mode (SMM). In addition to initializing the information handling system and all of its hardware, the BIOS also stores hardware settings. Settings that may be stored in the BIOS include the boot order, memory and bus clock speed settings, or system passwords. Early in the boot process, the BIOS will begin a power-on procedure, such as a power-on self test (POST). During POST, the BIOS identifies hardware components installed or connected to the information handling system, performs initialization of connected hardware, and performs other tasks necessary to prepare the information handling system for loading an operating system. After the POST routine completes, the BIOS may enter a setup mode. During setup, a user may choose to change various parameters of the BIOS, such as setting the boot order.

Once BIOS setup is complete, or the user ignores the option to enter setup, the BIOS will attempt to load an operating system from a bootable device. The bootable device is typically a hard disk drive, but may be any type of bootable device, such as a CD/DVD drive, or a flash drive. When multiple bootable devices are present, the BIOS will attempt to load the operating system according to the boot order. For example, the BIOS may be set to attempt booting from a CD/DVD drive, and if that fails, to boot from a hard disk connected to a storage controller. Before control is passed to the operating system, the central processing unit will transition from system management mode into a lower privileged or non-privileged mode. The operating system will control execution of the information handling system until a system management interrupt (SMI) is generated. When a SMI is generated, the central processing unit saves certain aspects of the state of the information handling system, and transfers control to BIOS code. The BIOS code will operate in system management mode until it returns from the interrupt. Once the SMI is handled, the central processing unit restores the state of the system, and normal operation continues.

As the number of information handling systems has increased, the need for centralized management of BIOS settings has become critical to enable cost effective systems management. In networked environments, Serial over LAN has become a common method of managing BIOS settings. A number of management interfaces provided by information handling systems have been proprietary. Recently, standardized interfaces, such as the Desktop and Mobile Architecture for System Hardware, have been developed to manage BIOS settings.

SUMMARY

In accordance with the present disclosure, a system and method for a managed BIOS is disclosed. A software for a BIOS in an information handling system is provided on a computer readable medium. A first code, for execution on a central processing unit (CPU), is operable to initiate a connection to a management controller through a controller, send a message to the management controller through the controller, and receive a message from the management controller through the controller in response to a system management interrupt. The first code is also operable to stall a power-on procedure if it is able to determine a plurality of bootable devices before the connection to the management controller is ready. The first code is further operable to stall the power-on procedure before releasing control to an operating system if the management controller is active.

An information handling system is disclosed having a controller coupled to a CPU, and a management controller coupled to the CPU and the controller. The CPU is operable to initiate a connection to the management controller through the controller. The CPU is able to send a message to the management controller through the controller, and is able to receive a message from the management controller through the controller in response to a system management interrupt. The CPU is also operable to stall a power-on procedure if it is able to determine a plurality of bootable devices before the connection to the management controller is ready. The CPU is further operable to stall the power-on procedure before releasing control to an operating system if the management controller is active.

A method of operating a BIOS in an information handling system comprises executing a first code on a CPU. Executing the first code comprises initiating a connection to a management controller through a controller, sending a message to the management controller through the controller, and receiving a message from the management controller through the controller in response to a system management interrupt. The power-on procedure is stalled if the first code is able to determine a plurality of bootable devices before the connection to the management controller is ready, and stalled before releasing control to an operating system if the management controller is active.

The system and method disclosed herein is technically advantageous because it offloads tasks associated with handling messages between a CPU and a management controller to a separate controller. This enables the BIOS to continue executing the power-on procedure on the CPU while the controller independently establishes a connection to the management controller, and as the controller passes messages to and from the management controller. A second advantage of the system and method disclosed is that it allows for the use of transport protocols that are more resource intensive than Serial over LAN while maintaining an acceptable level of responsiveness to the user during the power-on procedure. A third advantage of the system and method disclosed is that the use of system management interrupts helps ensure security of the BIOS code and the communications with the controller and management controller. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow diagram illustrating the operation of a BIOS according to the system and method disclosed herein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1A:
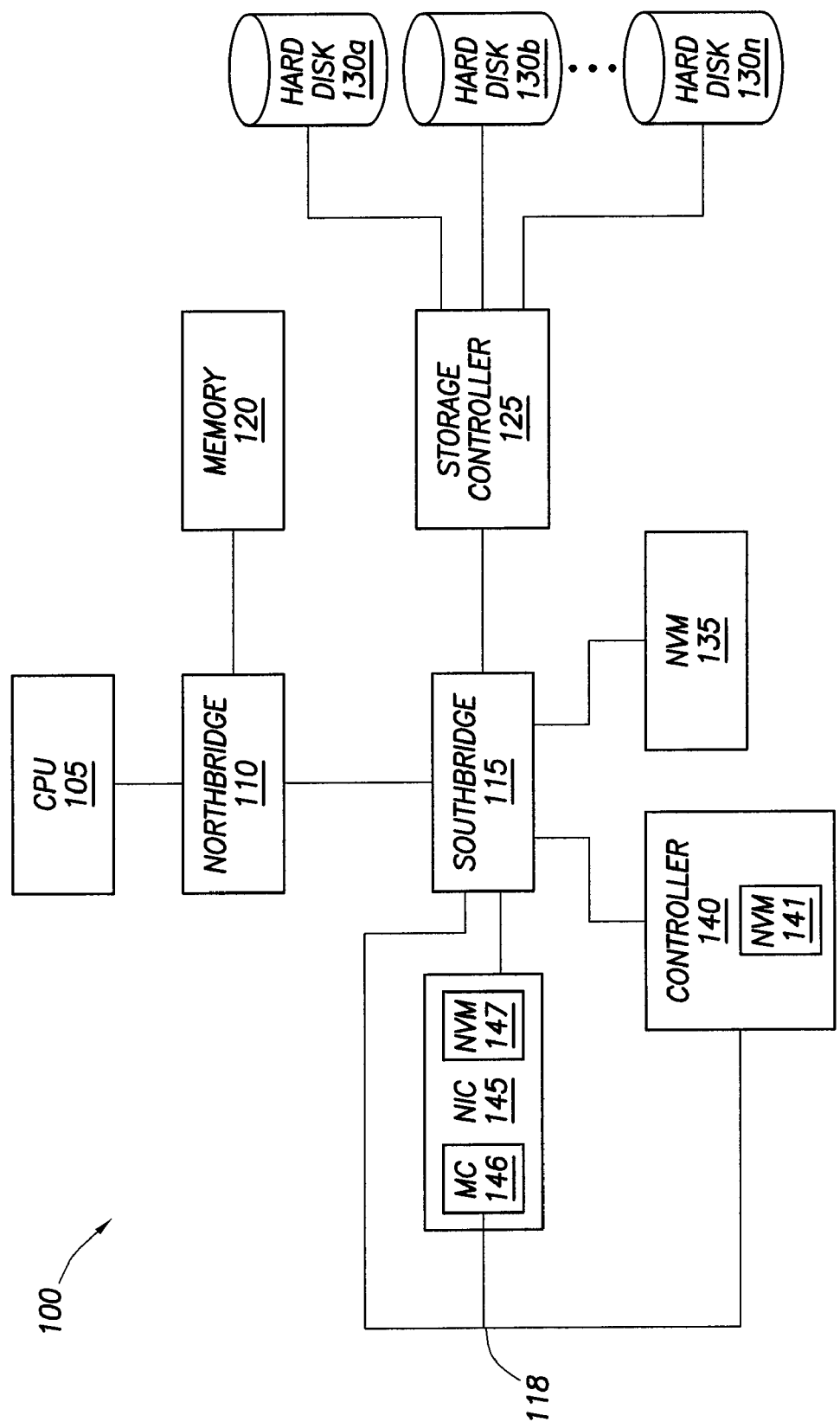
FIG. 1A is an embodiment of an information handling system according to the system and method disclosed herein where the management controller is embedded in the network interface card.

Shown in FIG. 1A is an embodiment of an information handling system according to the system and method disclosed herein where the management controller is embedded in the network interface card. Information handling system 100 has a central processing unit (CPU) 105. CPU 105 may have one or more privileged modes of operation, including a systems management mode. CPU 105 is coupled to northbridge 110. The northbridge 110 provides a connection between CPU 105, memory 120, and southbridge 115. Memory 120 may be any type of random access memory, such as DDR memory provided on one or more DIMMs. Southbridge 115 provides connectivity to other devices that typically operate at lower speeds. One such device is storage controller 125. Other devices connected to southbridge 115 include nonvolatile memory (NVM) 135, controller 140, and network interface card (NIC) 145. Storage controller 125 is connected to one or more hard disk drives 130a-n. There is at least one partition in storage controller 125 that contains a bootable partition for an operating system. In another embodiment, the bootable partition may be located on another computer readable medium, such as a CD drive, DVD drive, or USB device, connected to southbridge 115. Nonvolatile memory 135 contains the codes for the BIOS and other firmware needed to operate the information handling system 100. Nonvolatile memory 135 may be a flash memory. Controller 140 is operable to execute code loaded from nonvolatile memory 141, and interface with other hardware in the information handling system 100, such as CPU 105 or management controller 146. Controller 140 may have its own nonvolatile memory 141 for storing data and code used by controller 140.

Figure 1B:
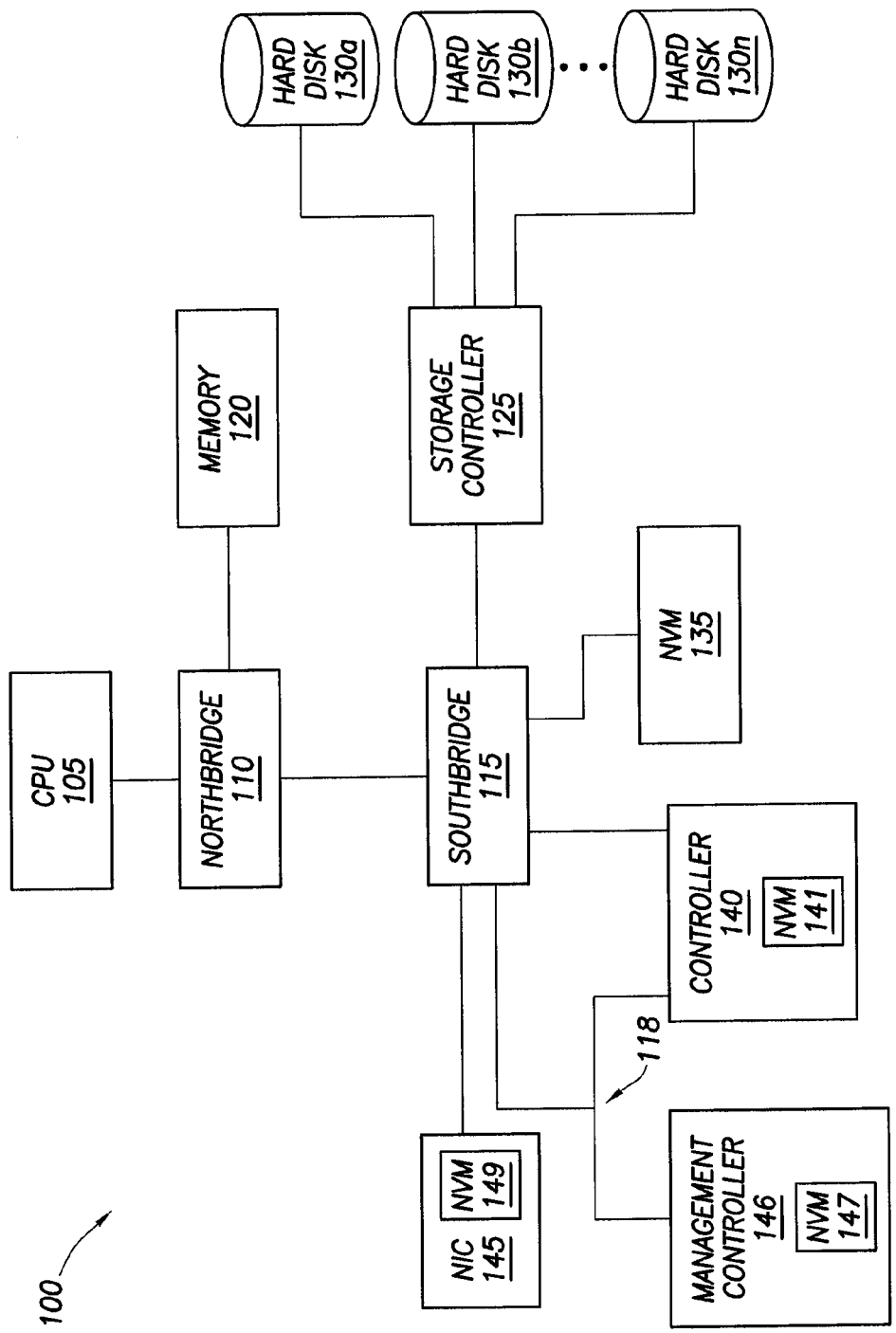
FIG. 1B is an embodiment of an information handling system according to the system and method disclosed herein where the management controller is separate from the network interface card.

In one embodiment, management controller (MC) 146 may be embedded in NIC 145, which may have nonvolatile memory 147. In this embodiment, NIC 145 and MC 146 share NVM 147. NVM 147 may store data and codes for operating both NIC 145 and MC 146. SM Bus 118 provides a pathway for communication between controller 140, management controller 146, and southbridge 115. SM Bus 118 may be a simple two-wire bus derived from the I2C bus specification. Communication between MC 146 and southbridge 115 may be according to the Alert Standard Format (ASF). Communication between controller 140 and MC 146 may be according to the Platform Level Data Model (PLDM). In a different embodiment, as illustrated in FIG. 1B, management controller 146 may be separate from NIC 145. In this embodiment, MC 146 has its own nonvolatile memory 147, and NIC 145 has its own nonvolatile memory 149.

When the information handling system is powered on, CPU 105 may be directed to begin executing the instructions that comprise the BIOS from nonvolatile memory 135. The instructions from nonvolatile memory 135 may be loaded directly, or may be copied to a location in memory 120 by northbridge 110. The operation of the BIOS will be explained in greater detail in connection with the other figures.

Figure 2:
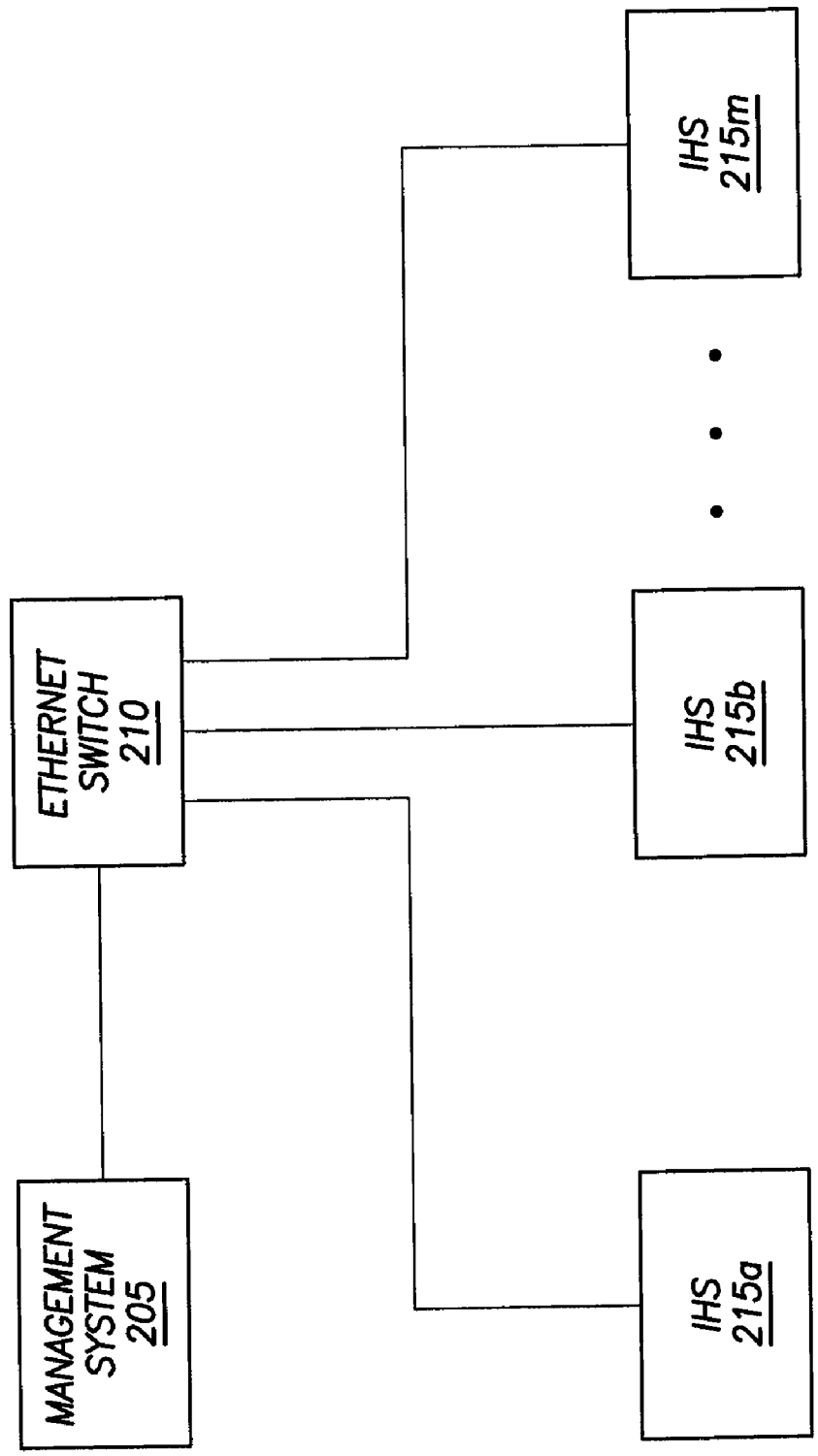
FIG. 2 illustrates a computer network.

FIG. 2 illustrates a computer network. Ethernet switch 210 provides connectivity between various components of the network. Management system 205 is an information handling system that is configured to manage the BIOS settings of other information handling systems that implement the system and method disclosed herein. The management system 205 may implement a DASH client. Information handling system 215a is a system configured to be managed by management system 205. Information handling system 215a may implement a DASH manageability access point (MAP). Management system 205 and information handling system 215a communicate by sending messages over the network. A message may contain a command or a response. A command to the BIOS may request information about connected hardware or the information handling system in general, or may be an instruction to change a setting stored in the BIOS. A response from the BIOS may be an acknowledgment that a command was successfully executed, or some sort of formatted structure containing information. A command to the management system may be to request any new settings, or simply a request for the current date and time. The management system may respond in the same manner as the BIOS. If the management system 205 and information handling system 215a implement DASH, the messages may be in an XML format compliant with the DASH specification.

FIG. 3 is a flow diagram illustrating the operation of a BIOS according to the system and method disclosed herein. At step 301, the information handling system is powered-on or reset. At step 303, the central processing unit 105 begins executing instructions that comprise the BIOS. The BIOS begins a power-on procedure. The power-on procedure may be a POST. Early in the execution of the POST, an instruction will cause the BIOS to initiate a connection between the management controller 146 and controller 140 at step 305. In one implementation, the BIOS code executing on the central processing unit sends a "link test" command. The link test command may be a request to set the date/time of the BIOS directed to management controller 146 through controller 140. The format of commands between MC 146 and controller 140 may be according to the Platform Level Data Model. Communication between MC 146 and controller 140 may be according to the Management Component Transport Protocol (MCTP).

To initiate the connection to MC 146 and provide reliable message delivery between MC 146 and CPU 105, controller 140 loads its own set of instructions from nonvolatile memory 141. The code for controller 140 is operative to handle communications between the code running on the CPU 105 and MC 146 autonomously. Controller 140 provides reliable message delivery using a protocol, such as Management Control Transport Protocol. Tasks that may be handled by controller 140 include arbitration, monitoring acknowledgments, packetizing messages, calculating and verifying cyclic redundancy checks, or resending messages if a response is not received within a predetermined period. Controller 140 can communicate with CPU 105 using a variety of methods, which include a mailbox register or a shared memory. Controller 140 can signal that a message is waiting for the CPU 105 by generating a system management interrupt. The offloading of message delivery related tasks from CPU 105 to controller 140 and the use of interrupts allows the system and method disclosed to emulate a multi-threaded environment.

While controller 140 initiates a connection with management controller 146, CPU 105 continues executing the POST at step 307. Step 309 is a synchronization point between the code running on CPU 105 and the code running on controller 140. If a connection has not been established between controller 140 and management controller 146 by the time CPU 105 reaches step 309, processing of the POST will stall. Otherwise, if the connection has been established before CPU 105 reaches step 309, controller 140 will wait or stall. Once the codes are synchronized, CPU 105 will determine which devices are bootable, and send the information to management controller 146 through controller 140 at step 311. CPU 105 may send information that describes each bootable device in a format according to the Platform Level Data Model. Controller 140 receives the information from CPU 105 and sends the appropriate message, or messages, to management controller 146.

CPU 105 will continue the POST at step 313. During this time, controller 140 may receive one or more messages from management controller 146. The queued-up messages from management system 205 in MC 146 are sent to information handling system 100. These messages may contain commands to be executed by the BIOS, or information requests directed to the BIOS. When controller 140 receives a proper message from management controller 146, a system management interrupt is generated. The interrupt handler running on CPU 105 will process the messages received, and may send messages of its own to management system 205 through controller 140 and management controller 146. While CPU 105 is executing any commands or messages it has received, the CPU 105 operates in system management mode. Messages sent by CPU 105 may be acknowledgements, or requests for service from the management system 205. This activity may be referred to as management activity. Through this management activity, management system 205 may discover or alter information and settings contained in the information handling system's BIOS.

At step 315, the POST being executed by BIOS code running on CPU 105 is ready to enter the BIOS setup mode or release control to an operating system. This is another synchronization point between the codes running on CPU 105 and controller 140. At this point, processing of the POST will stall, for example CPU 105 may wait, until management activity is finished (the connection with management controller 145 is inactive). Once CPU 105 determines that management activity is finished, CPU 105 executes the portion of BIOS code for setup mode at step 317. If the user bypasses setup, or does nothing, the BIOS will begin loading the operating system from a bootable device.

Although the present disclosure has been described in detail, it should be understood that various changes, substitutions, and alterations can be made hereto without departing from the spirit and the scope of the invention as defined by the appended claims.

What is claimed is:

1. Software for a BIOS provided on a non-transitory computer readable medium comprising a first code for execution on a central processing unit operable to:
    initiate a connection to a management controller through a controller;
    send a message to the management controller through the controller;
    receive a message from the management controller through the controller in response to a system management interrupt;
    stall a power-on procedure if the first code is able to determine a plurality of bootable devices before the connection to the management controller is ready; and
    stall the power-on procedure before releasing control to an operating system if the management controller is active.

2. The software of claim 1 comprising a second code for execution on the controller operable to:
    send the message to the management system generated by the first code executing on the central processing unit; and
    receive the message from the management controller and generate the system management interrupt.

3. The software of claim 2, wherein the second code is operable to packetize the message sent to the management controller.

4. The software of claim 3, wherein the second code is operable to resend the message to the management controller if a response is not received within a predetermined time limit.

5. The software of claim 4, wherein initiate the connection to the management controller through the controller comprises sending a link test command to the management controller through the controller.

6. The software of claim 4, wherein the first code is executed in a system management mode of the central processing unit.

7. The software of claim 6, wherein the BIOS implements DASH.

8. An information handling system, comprising:
a controller coupled to a central processing unit; and
a management controller coupled to the central processing unit and the controller;
wherein the central processing unit is operable to:
   initiate a connection to the management controller through the controller;
   send a message to the management controller through the controller;
   receive a message from the management controller through the controller in response to a system management interrupt;
   stall a power-on procedure if the first code is able to determine a plurality of bootable devices before the connection to the management controller is ready; and
   stall the power-on procedure before releasing control to an operating system if the management controller is active.

9. The system of claim 8, wherein the controller is operable to:
   send the message to the management controller generated by the central processing unit; and
   receive the message from the management controller and generate the system management interrupt.

10. The system of claim 9, wherein the controller is operable to packetize the message sent to the management controller.

11. The system of claim 10, wherein the controller is operable to resend the message to the management controller if a response is not received within a predetermined time limit.

12. The system of claim 11, wherein initiate the connection to the management controller through the controller comprises sending a link test command to the management controller through the controller.

13. The system of claim 11, wherein the central processing unit operates in a system management mode when receiving the message.

14. The system of claim 13 comprising a network interface card coupled to the central processing unit and controller wherein the management controller is embedded in the network interface card.

15. A method of operating a BIOS, comprising:
executing a first code on a central processing unit, the step comprising:
   initiating a connection to a management controller through a controller;
   sending a message to the management controller through the controller;
   receiving a message from the management controller through the controller in response to a system management interrupt;
   stalling a power-on procedure if the first code is able to determine a plurality of bootable devices before the connection to the management controller is ready; and
   stalling the power-on procedure before releasing control to an operating system if the management controller is active.

16. The method of claim 15, comprising:
executing a second code on the controller, the step comprising:
   sending the message to the management controller generated by executing the first code on the central processing unit; and
   receiving the message from the management controller and generating the system management interrupt.

17. The method of claim 16, wherein executing the second code on the controller comprises packetizing the message sent to the management controller.

18. The method of claim 17, wherein executing the second code on the controller comprises resending the message to the management controller if a response is not received within a predetermined time limit.

19. The method of claim 18, wherein initiating the connection to the management controller through the controller comprises sending a link test command to the management controller through the controller.

20. The method of claim 4, wherein the first code on the central processing unit is executed in a system management mode of the central processing unit.

\* \* \* \* \*